United States Patent Office 2,875,213
Patented Feb. 24, 1959

2,875,213

RECOVERY OF GAMMA-BUTYROLACTONE

George B. Ulvild, Robstown, Tex., and James S. MacKenzie, Morristown, N. J., assignors to Celanese Corporation of America, New York, N. Y., a corporation of Delaware No Drawing. Application September 10, 1954
Serial No. 455,360

12 Claims. (Cl. 260—343.6)

This invention relates to gamma-butyrolactone and relates more particularly to the recovery of gamma-butyrolactone from crude mixtures containing the same.

The art is well acquainted with the production of oxygenated organic compounds by the partial oxidation of aliphatic hydrocarbons, such as aliphatic hydrocarbons having 3 to 5 carbon atoms, e. g. propane or butane or pentane, or mixtures of the same. The reaction products obtained by such partial oxidation are generally mixtures containing, among other compounds, lower fatty acids such as acetic, propionic and butyric acids. It has now been found that these mixtures also contain significant amounts of gamma-butyrolactone. However, the separation of this gamma-butyrolactone in a relatively pure state from the other constituents of the mixture by conventional techniques, such as fractional distillation, has been found to be very difficult.

It is, therefore, an important object of this invention to provide a novel, practical and economical process for the separation of gamma-butyrolactone from mixtures containing the same.

Another object of this invention is the provision of a new process for the separation of gamma-butyrolactone of high purity from the mixture of reaction products obtained by the partial oxidation, in the liquid phase, of aliphatic hydrocarbons.

Other objects of this invention will be apparent from the following detailed description and claims.

In accordance with this invention it has been found that the difficulty in isolating gamma-butyrolactone of high purity (e. g. of purity greater than 95 mole percent gamma-butyrolactone, as determined by mass spectrographic analysis) from the reaction products produced by the partial oxidation of hydrocarbons is due to the fact that such reaction products contain glycol esters which boil, at most pressures, over a relatively narrow range near the boiling point of gamma-butyrolactone. These glycol esters are mono- and diesters of lower monocarboxylic acids, such as mono- and diformates, acetates, propionates and possibly butyrates of ethylene, propylene and 2,3-butylene glycols.

In accordance with this invention, gamma-butyrolactone of high purity is separated from mixtures thereof containing glycol esters by subjecting said mixtures to a solvent extraction with a liquid aliphatic hydrocarbon. The liquid aliphatic hydrocarbon forms a separate phase in which the glycol esters are concentrated. For most efficient and economical operation there is employed a dual solvent extraction in which water and the liquid aliphatic hydrocarbon are added to the mixture to be purified. In this dual solvent extraction the gamma-butyrolactone becomes concentrated in the water phase and the mono- and diesters of the glycols are concentrated in the hydrocarbon phase. After separation of the phases, the gamma-butyrolactone is separated from the aqueous phase in any convenient manner, as by distillation of the water, while the hydrocarbon is distilled off from the glycol esters and recycled to the extraction zone. The water distilled off from the aqueous phase generally contains some gamma-butyrolactone and is advantageously also recycled to the extraction zone. The gamma-butyrolactone obtained by the method of this invention is of high purity, mass spectrographic analysis showing a purity of greater than 95 mole percent, e. g. 98 to 100 mole percent corresponding to about 98 to 100 weight percent of gamma-butyrolactone.

As stated, the mixtures produced by the oxidation of aliphatic hydrocarbons generally contain lower monocarboxylic acids such as acetic, propionic and butyric acids. It has been found that the presence of a large amount of such acids in the mixtures being extracted in accordance with this invention tends to reduce the extraction efficiency, since the lower monocarboxylic acids act as blending agents. Accordingly, it is preferred to use as the extraction feedstock a mixture comprising not more than about 2% by weight of lower monocarboxylic acids. Such mixtures may be produced by subjecting the reaction products obtained by the liquid phase oxidation of aliphatic hydrocarbons to fractional distillation until there is obtained a mixture containing, by mass spectrographic analysis, at least about 85 mole percent of gamma-butyrolactone, generally corresponding to at least about 85 weight percent of gamma-butyrolactone. Preferably this distillation is carried out to produce a mixture containing at least 95 mole percent of gamma-butyrolactone, as determined by mass spectrographic analysis. Depending on the particular mixture this purity of 95 mole percent corresponds to a gamma-butyrolactone content of about 90 to 95% by weight.

For greatest efficiency, the extraction procedure of this invention is preferably carried out in a plurality of stages. The extraction may be performed in any suitable manner, in either countercurrent or cocurrent fashion, batchwise or continuously. The amounts of water and hydrocarbon may be varied over wide ranges. In the dual solvent extraction it is preferred that both the water and the liquid aliphatic hydrocarbon be added to the mixture being purified before the two phases are separated. However, if desired, the mixture being purified may be extracted first with one of the extractants, i. e. the hydrocarbon or the water, and then with the other extractant.

The aliphatic hydrocarbons employed in the extraction process of this invention may be open chain aliphatic or cycloaliphatic and are preferably saturated. Hydrocarbons containing 5 to 7 carbon atoms are preferred. Examples of suitable aliphatic hydrocarbons are n-pentane, n-hexane and n-heptane.

The temperature of the extraction may be varied as desired. A suitable temperature range is, for example, from room temperature to the temperature where the two-phase mixture begins to boil.

The following example is given to illustrate this invention further.

*Example*

By liquid phase oxidation of n-butane, followed by distillation to remove the more volatile products and further distillation to separate the desired mixture from the highest boiling and non-distillable materials, there is obtained a mixture comprising 42.3% by weight of gamma-butyrolactone, 0.8% by weight of water, 6.1% by weight of acetic acid, 23.2% by weight of propionic acid, 19.8% by weight of butyric acid, 7.0% by weight of glycol esters, and the balance, less than 1%, of minor impurities. This mixture is further purified by flash distillation under a subatmospheric pressure of less than 100 mm. of mercury and the material flashed overhead is then further distilled at atmospheric pressure to produce a fraction containing about 90% by weight of gamma-butyrolactone, 0.3% by weight of monocarboxylic acids calculated as gamma-hydroxybutyric acid, 0.22% by weight of water and more than 3% by weight of glycol esters of monocarboxylic acids. This fraction is subjected to a continuous countercurrent dual solvent extraction with a solvent consisting of equal volumes of n-hexane and water. The extraction is carried out in an extraction column utilizing about 6 theoretical stages, at 30° C. and atmospheric pressure. The solvent to feed ratio is 2 to 1. The extraction column light liquid outlet stream contains primarily n-hexane and glycol esters. This stream is subjected to a simple fractional distillation to recover n-hexane as a distillate which is returned to the extraction. The glycol esters are discarded. The extraction column heavy liquid outlet stream comprises primarily water and gamma-butyrolactone. This aqueous stream is distilled at a subatmospheric pressure of 100 mm. of mercury at a temperature of 52 to 125° C. to remove water and a negligible amount of gamma-butyrolactone. The residue of this distillation is then distilled at a subatmospheric pressure of 140 mm. of mercury at 60 to 145° C. to remove a small amount of a front ends fraction containing water and gamma-butyrolactone, and thereafter at 145 to 147° C. to remove a gamma-butyrolactone cut containing more than 98.0% by weight of gamma-butyrolactone, 0.23% by weight of monocarboxylic acids, calculated as gamma-hydroxy butyric acid, 0.16% by weight of water, and only a small trace of glycol esters. The aforesaid front ends fraction may be returned to the extraction, together with the water removed in the first distillation of the aqueous phase.

It is to be understood that the foregoing detailed description is given merely by way of illustration and that many variations may be made therein without departure from the spirit of our invention.

Having described our invention, what we desire to secure by Letters Patent is:

1. Process for the purification of gamma-butyrolactone which comprises extracting a mixture of gamma-butyrolactone and a glycol ester of the group consisting of lower alkanoic esters of ethylene, propylene and butylene glycols with water and a saturated liquid aliphatic hydrocarbon and removing the resulting hydrocarbon phase containing said glycol ester.

2. Process for the purification of gamma-butyrolactone, which comprises adding water and a saturated liquid aliphatic hydrocarbon to a mixture of gamma-butyrolactone and a glycol ester of the group consisting of lower alkanoic esters of ethylene, propylene and butylene glycols to form an aqueous phase containing the gamma-butyrolactone and a hydrocarbon phase containing said glycol ester, separating the aqueous phase from the hydrocarbon phase and recovering the gamma-butyrolactone from the aqueous phase.

3. Process as set forth in claim 2 in which the aqueous phase is distilled to vaporize a fraction containing water and a minor part of the gamma-butyrolactone and said fraction is recycled by mixing it with a further quantity of said mixture of gamma-butyrolactone and said glycol ester and with said hydrocarbon to form two phases.

4. Process as set forth in claim 2 in which said hydrocarbon is selected from the group consisting of n-pentane, n-hexane and n-heptane.

5. Process for the separation of gamma-butyrolactone from a mixture thereof containing a glycol ester of the group consisting of lower alkanoic esters of ethylene, propylene and butylene glycols together with a lower aliphatic monocarboxylic acid, which comprises distilling said mixture to reduce the proportion of monocarboxylic acid therein, adding water and a saturated liquid aliphatic hydrocarbon to the resulting mixture to form an aqueous phase containing the gamma-butyrolactone and a hydrocarbon phase containing said glycol ester, separating the aqueous phase from the hydrocarbon phase and recovering the gamma-butyrolactone from the aqueous phase.

6. Process as set forth in claim 5 in which said hydrocarbon is selected from the group consisting of n-pentane, n-hexane and n-heptane.

7. Process as set forth in claim 5 in which the concentration of monocarboxylic acid after said distillation is not above about 2% by weight.

8. Process for the recovery of gamma-butyrolactone from a mixture produced by the liquid phase oxidation of an aliphatic hydrocarbon, which mixture comprises lower aliphatic monocarboxylic acids, gamma-butyrolactone and glycol esters of the group consisting of lower alkanoic esters of ethylene, propylene and butylene glycols, which process comprises distilling said mixture to produce a fraction containing gamma-butyrolactone, said glycol esters and not above about 2% by weight of monocarboxylic acids, adding water and a saturated liquid aliphatic hydrocarbon to said fraction to form an aqueous phase containing the gamma-butyrolactone and a hydrocarbon phase containing said glycol esters, separating the aqueous phase from the hydrocarbon phase and recovering the gamma-butyrolactone from the aqueous phase.

9. Process as set forth in claim 8 in which said mixture is produced by the partial oxidation of a hydrocarbon comprising n-butane.

10. Process as set forth in claim 9 in which said fraction contains at least about 85 weight % of gamma-butyrolactone.

11. Process as set forth in claim 10 in which said liquid hydrocarbon is selected from the group consisting of n-pentane, n-hexane and n-heptane.

12. Process as set forth in claim 11 in which the aqueous phase is distilled to vaporize a fraction containing the water and a minor part of the gamma-butyrolactone and this fraction is recycled by mixing it with a further quantity of said mixture of gamma-butyrolactone and said glycol esters and with said hydrocarbon to form two phases.

References Cited in the file of this patent
UNITED STATES PATENTS

| | | |
|---|---|---|
| 2,081,721 | Van Dijck | May 25, 1937 |
| 2,165,438 | Allquist | July 11, 1939 |
| 2,346,783 | Plewes | Apr. 18, 1944 |
| 2,358,229 | Isham | Sept. 12, 1944 |
| 2,358,979 | Isham | Sept. 26, 1944 |

OTHER REFERENCES

Shriner et al.: Iden. of Org. Compds., ch. X, pages 289, 293, 3rd ed., Wiley (1948).

Handbook of Chem. and Physics, Chem. Rubber Publg. Co., 30th ed., 1947, pages 712–713; 836–837.